US011442455B2

(12) United States Patent
Cho et al.

(10) Patent No.: US 11,442,455 B2
(45) Date of Patent: Sep. 13, 2022

(54) METHOD AND APPARATUS FOR GENERATING LOCAL MOTION BASED ON MACHINE LEARNING

(71) Applicant: Samsung Electronics Co., Ltd., Suwon-si (KR)

(72) Inventors: Joon-Kee Cho, Yongin-si (KR); Kyung-Rock Kim, Yongin-si (KR); Taesin Ha, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 342 days.

(21) Appl. No.: 16/672,987

(22) Filed: Nov. 4, 2019

(65) Prior Publication Data
US 2020/0201340 A1 Jun. 25, 2020

(30) Foreign Application Priority Data
Dec. 24, 2018 (KR) .................. 10-2018-0168577

(51) Int. Cl.
*G05D 1/02* (2020.01)
*G05B 13/02* (2006.01)

(52) U.S. Cl.
CPC ......... *G05D 1/0214* (2013.01); *G05B 13/027* (2013.01); *G05D 1/0221* (2013.01); *G05D 1/0274* (2013.01)

(58) Field of Classification Search
CPC .. G05D 1/0214; G05D 1/0221; G05D 1/0274; G05D 2201/0203; G05D 1/0212; G05D 1/0238; G05B 13/027
See application file for complete search history.

(56) References Cited

U.S. PATENT DOCUMENTS 9,740,209 B2    8/2017    Nakano et al.
9,902,062 B2    2/2018    Grotmol et al.
(Continued)

FOREIGN PATENT DOCUMENTS

DE    102012103847 A1 * 11/2012    ............ G08G 1/166
KR    10-1650128    8/2011
(Continued)

OTHER PUBLICATIONS

Gerkey, Brian P. et al., "Planning and Control in Unstructured Terrain" In Workshop on Path Planning on Costmaps; Proceedings of the IEEE International Conference on Robotics and Automation (ICRA), May 2008.
(Continued)

*Primary Examiner* — Rodney A Butler
(74) *Attorney, Agent, or Firm* — Harness, Dickey & Pierce, P.L.C.

(57) ABSTRACT

Apparatuses and methods for generating a local motion of a mobile object based on a machine learning are disclosed. The methods may include determining, by processing circuitry, a local window corresponding to a current position of the mobile object in a global area; generating, by processing circuitry, a local cost map indicating a probability of a collision of the mobile object with an obstacle in the local window; generating, by processing circuitry, a local goal map indicating a local path in the local window between the current position and a local goal in the local window; and determining, by processing circuitry, a target velocity of the mobile object based on output data of a neural network, the output data based on an input of input data to the neural network, the input data including the local cost map, the local goal map, and a current velocity of the mobile object.

19 Claims, 12 Drawing Sheets

(56) References Cited

U.S. PATENT DOCUMENTS

| | | |
|---|---|---|
| 2008/0059015 A1 | 3/2008 | Whittaker et al. |
| 2009/0062958 A1* | 3/2009 | Morris et al. |
| 2019/0212453 A1* | 7/2019 | Natroshvili ............ G08G 1/166 |
| 2020/0401148 A1* | 12/2020 | Hong ................... G05D 1/0246 |

FOREIGN PATENT DOCUMENTS

| | | |
|---|---|---|
| KR | 10-1140984 | 5/2012 |
| KR | 20120118070 A | 10/2012 |
| KR | 10-2013-0091879 A | 8/2013 |
| KR | 20140034996 A | 3/2014 |
| KR | 10-1598385 | 3/2016 |
| KR | 10-2017-0034069 A | 3/2017 |
| KR | 10-2018-0023303 A | 3/2018 |
| KR | 10-2018-0058303 A | 6/2018 |
| KR | 10-2018-0074144 A | 7/2018 |
| KR | 10-2018-0087798 A | 8/2018 |

OTHER PUBLICATIONS

Fox, Dieter et al., "The Dynamic Window Approach to Collision Avoidance" IEEE Robotics & Automation Magazine, Mar. 1997, Pittsburgh, PA., p. 1-23.

* cited by examiner

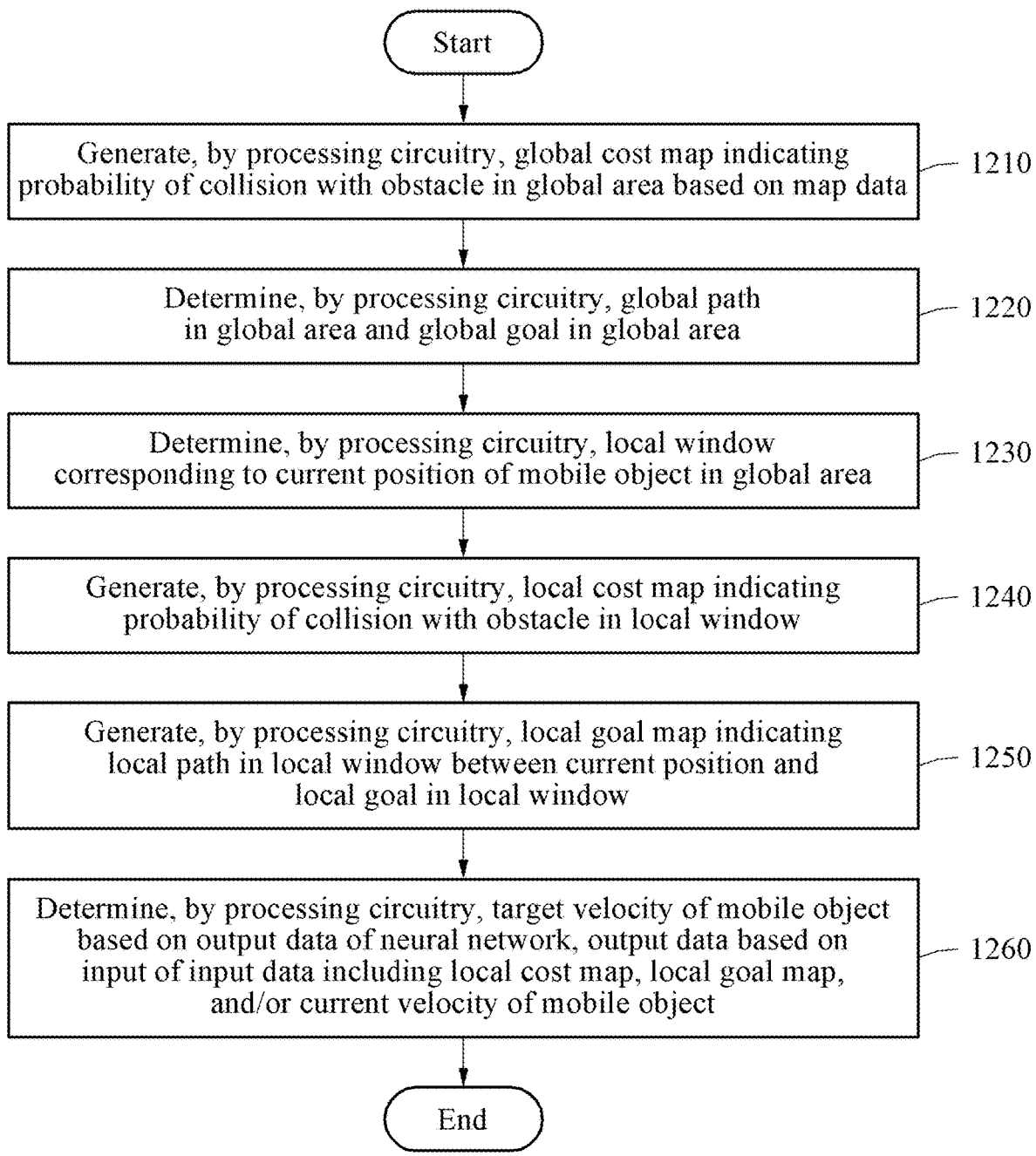

METHOD AND APPARATUS FOR GENERATING LOCAL MOTION BASED ON MACHINE LEARNING

CROSS-REFERENCE TO RELATED APPLICATION

This application claims under 35 U.S.C. § 119 to Korean Patent Application No. 10-2018-0168577, filed on Dec. 24, 2018, in the Korean Intellectual Property Office, the entire contents of which are incorporated herein by reference in their entirety.

BACKGROUND

1. Field

At least some example embodiments relate to methods and/or apparatuses for generating a local motion based on machine learning.

2. Description of the Related Art

Recently, to classify an input pattern as a member that belongs to a predetermined group, researchers are actively conducting research on methods of applying efficient and accurate pattern recognition. One such area of research is focused on an artificial neural network. To classify an input pattern as a member that belongs to a predetermined group, the neural network employs an algorithm that generates a mapping between an input pattern and an output patterns. The capability of generating such a mapping may be referred to as a learning capability of the neural network. Further, the neural network may have a generalization capability of generating a relatively accurate output with respect to an input pattern yet to be used for learning, based on a result of learning.

SUMMARY

Some example embodiments relate to methods of generating a local motion for a mobile object.

In some example embodiments, the method may include determining a local window corresponding to a current position of the mobile object in a global area, generating a local cost map indicating a probability of a collision with an obstacle in the local window, generating a local goal map indicating a local path in the local window between the current position and a local goal in the local window, and determining a target velocity of the mobile object based on output data of a neural network, the output data based on an input of input data to the neural network, the input data including the local cost map, the local goal map, and a current velocity of the mobile object.

In some example embodiments, a method may further include controlling the mobile object to move based on the target velocity.

In some example embodiments, a method may further include generating a global cost map indicating a probability of a collision with an obstacle in the global area based on map data. The obstacle may be the same as the obstacle in the local window and/or another obstacle that is not included in the local window. The generating of the local cost map may include generating the local cost map based on sensor data associated with an obstacle around the mobile object and the global cost map. In some example embodiments, a method may further include determining a global path in the global area between the current position and a global goal in the global area based on the global cost map. The generating of the local goal map may include generating the local goal map based on the global path and the local window.

In some example embodiments, a neural network may include a competitive layer that operates based on pixel values of the local cost map and pixel values of the local goal map. The neural network may include an input layer that receives pixel values of the local cost map and pixel values of the local goal map, a first hidden layer that receives an output of the input layer, a second hidden layer that receives an output of the first hidden layer and the current velocity of the mobile object, and an output layer that generates the output data of the neural network based on an output of the second hidden layer.

In some example embodiments, a first hidden layer may be a competitive layer trained based on a competitive learning. Nodes of the input layer may be fully connected to nodes of the first hidden layer. A number of the nodes of the input layer may correspond to a sum of a number of pixels in the local cost map and a number of pixels in the local goal map.

In some example embodiments, a neural network may include a convolutional layer that extracts features from the local cost map and the local goal map, a fully connected layer that receives an output of the convolutional layer and the current velocity of the mobile object, and an output layer that generates the output data of the neural network based on an output of the fully connected layer.

In some example embodiments, a neural network may include an input layer that receives pixel values of the local cost map and pixel values of the local goal map, a first competitive layer that receives an output of the input layer, and a second competitive layer that generates the output data of the neural network based on an output of the first competitive layer. A value in a predetermined range may be represented based on a distribution of the output data of the neural network.

Some other example embodiments may relate to a method of generating a local motion for a mobile object.

In some example embodiments, a method may include determining, by processing circuitry, a local window corresponding to a current position of a mobile object in a global area; inputting, to a neural network, by the processing circuitry, input data including a local cost map indicating a probability of a collision of the mobile object with an obstacle in the local window, a local goal map indicating a local path in the local window between the current position and a local goal in the local window, and a current velocity of the mobile object; and determining, by the processing circuitry, a target velocity of the mobile object based on output data of the neural network, the output data of the neural network based on an input of the input data to the neural network.

In some example embodiments, a method may further include controlling the mobile object to move based on the target velocity.

Some other example embodiments may relate to an apparatus for generating a local motion for a mobile object.

In some example embodiments, an apparatus may include processing circuitry and a memory including an instruction to be read by the processing circuitry, wherein when the instruction is executed by the processing circuitry, the processing circuitry may be configured to determine a local window corresponding to a current position of the mobile object in a global area; generate a local cost map indicating a probability of a collision with an obstacle in the local window; generate a local goal map indicating a local path in the local window between the current position and a local goal in the local window; and determine a target velocity of the mobile object based on output data of a neural network, wherein the output data is based on an input of input data to the neural network, the input data including the local cost map, the local goal map, and a current velocity of the mobile object.

In some example embodiments, an apparatus may further include controlling the mobile object to move based on the target velocity.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 12 is a flowchart illustrating a local motion generation method according to at least one example embodiment.

DETAILED DESCRIPTION

Figure 1:
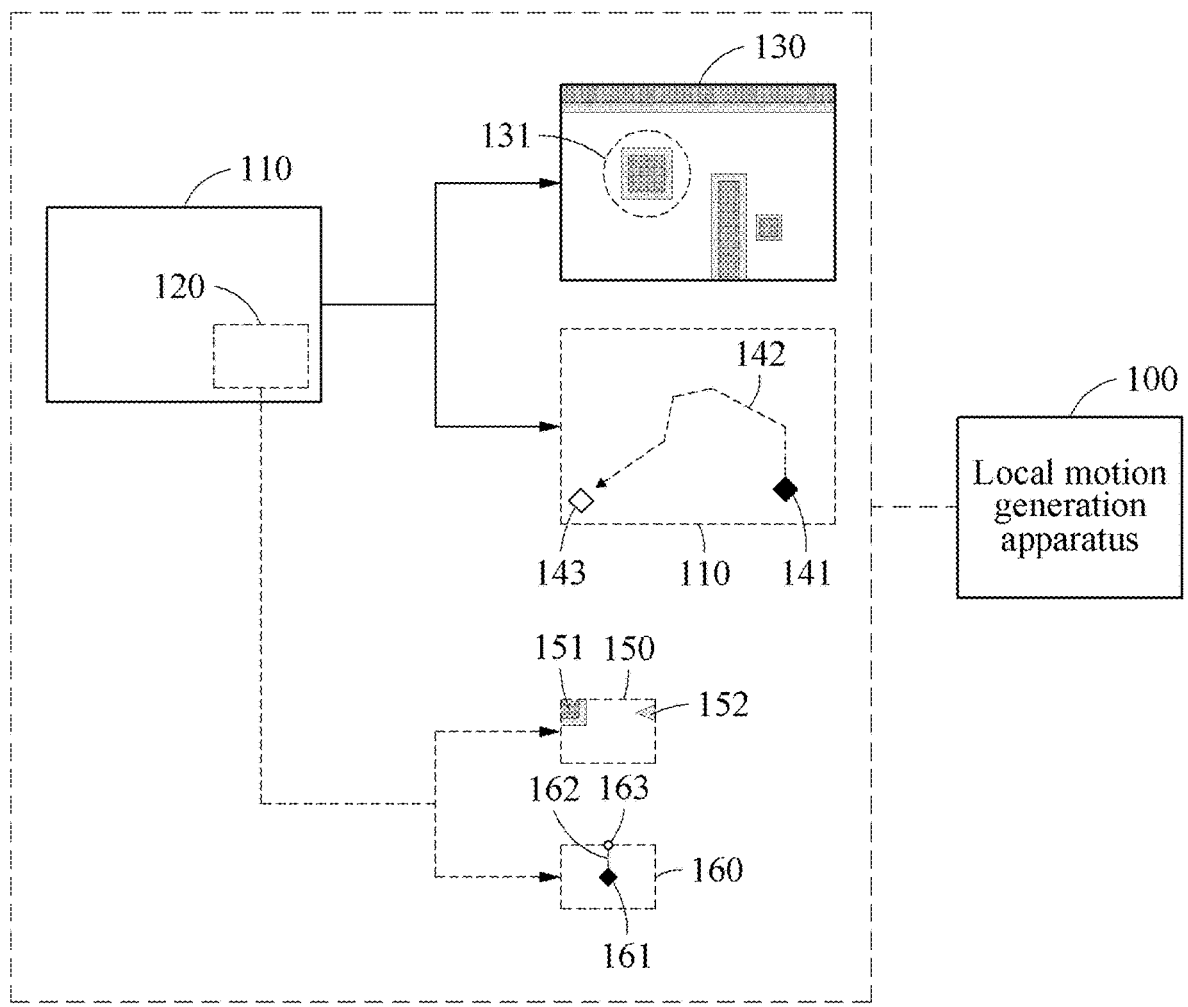
FIG. 1 illustrates an operation of a local motion generation apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an operation of a local motion generation apparatus according to at least one example embodiment. A local motion generation apparatus 100 may control a motion of a mobile object. The mobile object may be a movable physical object such as a cleaning robot, a social robot, a guiding robot, and a logistics robot, or a movable virtual object, for example, an agent in an environment such as a virtual reality (VR), an augmented reality (AR), and a game. The local motion generation apparatus 100 may determine a velocity and/or a path of the mobile object based on a destination being input and control the mobile object based on the determined path and/or velocity.

A velocity of the mobile object may include a translational velocity associated with a position movement and/or a rotational velocity associated with a direction and/or orientation change. The translational velocity may be denoted by v and the rotational and/or orientation velocity may be denoted by $\omega$. The velocity of the mobile object may be classified into a current velocity and a target velocity. The current velocity may indicate a measured and/or estimated velocity corresponding to a current movement of the mobile object. The target velocity may indicate a velocity to which the mobile object is controlled, for example, to follow a path from the current position to a position of a goal. The current velocity may include a current translational velocity and/or a current rotational velocity. The target velocity may include a target translational velocity and/or a target rotational velocity. The local motion generation apparatus 100 may determine a path between a current position of the mobile object and a desired destination, and/or may set (e.g., continuously, periodically, and/or occasionally) the target velocity based on the current velocity such that the mobile object moves along the determined path.

The term "state" of the mobile object may be used below. A state of the mobile object may include a position of the mobile object and/or a pose of the mobile object. The position of the mobile object may be represented by coordinates, for example, (x, y). The pose of the mobile object may be represented by an angle, for example, θ, which may represent a direction and/or orientation of the mobile object. The state of the mobile object may be classified into a current state and a target state. The current state may include a current position and/or a current pose. The target state may include a target position and/or a target pose. The target position may be used to determine a destination of the mobile object. The target pose may be used to determine a direction in which the mobile object faces at the target position. The target position may also be referred to as a goal.

FIG. 1 illustrates a global area 110 and a local window 120 in the global area 110. The global area 110 may correspond to an entire area of given map data or a partial area of given map data. The local window 120 may correspond to a partial area of the given map data that includes (e.g., is localized to) a current position of the mobile object in the global area 110.

Map data may include information such as an obstacle, a geographical feature, and/or a structure of a target space in which the mobile object moves. Here, the target space may include a real space, such as a house, an airport, a museum, an exhibition hall, and/or a warehouse, and/or may include a virtual space, such as a VR space, an AR space, and/or a game space. The obstacle of the map data may include a fixed obstacle such as a wall, a column, and/or an ornament. The map data may provide information on the target space in a form of a grid map. The grid map may represent a space using a grid including a plurality of cells. Values of the cells may represent, for example, an obstacle, a geographical feature, and a structure of the space.

The local motion generation apparatus 100 may generate, by processing circuitry, a global cost map 130 indicating a probability of a collision between the mobile object and an obstacle in the global area 110 based on the map data. Each pixel (or grid) of the global cost map 130 may have a pixel value (or grid value) corresponding to a cost. For example, the cost may indicate a probability of the mobile object colliding with an obstacle at a position corresponding to a pixel in the target space. A shaded portion in the global cost map 130 may indicate the cost. For example, a shaded portion 131 may correspond to an area having a probability of a collision between the mobile object and an obstacle. Obstacles in the global cost map 130 and the global area 110 may include fixed obstacles. For example, the shaded portion 131 may be a fixed obstacle.

The local motion generation apparatus 100 may determine, by processing circuitry, a current position 141 of the mobile object in the global area 110, a global goal 143 in the global area 110, and/or a global path 142 in the global area 110 between the current position and the global goal 143 based on the global cost map 130. For example, before the mobile object starts moving, the current position 141 may correspond to a start position. The local motion generation apparatus 100 may consider, by processing circuitry, a probability of a collision between the mobile object and an obstacle based on the global cost map 130 and may set the global path 142 such that the path of the mobile object passes through points and/or areas at which the probability is relatively low. The global path 142 may be set using an algorithm such as NF1, A*, and D*.

The global goal 143 may be set based on a target pose. The target pose may be input by a user. A destination to which the mobile object is to reach in the global area 110 may be referred to as the global goal 143. A destination to which the mobile object is to reach in a local area in the global area 110 may be referred to as a local goal 163. The local area may be determined using the local window 120.

The local motion generation apparatus 100 may determine, by processing circuitry, the local window 120 corresponding to a current position of the mobile object in the global area 110. For example, a center of the local window 120 may correspond to the current position of the mobile object. The local motion generation apparatus 100 may move, by processing circuitry, the local window 120 based on the current position of the mobile object. For example, the local motion generation apparatus 100 may determine, by processing circuitry, the current position of the mobile object at intervals of a predetermined time, and/or may move, by processing circuitry, the local window 120 at intervals of a predetermined time.

The local motion generation apparatus 100 may generate, by processing circuitry, a local cost map 150 indicating a probability of a collision between the mobile object and an obstacle in the local window 120. The local motion generation apparatus 100 may generate, by processing circuitry, the local cost map 150 based on the global cost map 130 and sensor data. The sensor data may include information on an obstacle around the mobile object. Like the global cost map 130, the local cost map 150 may include pixel values corresponding to costs.

In some example embodiments, obstacle information based on the sensor data may be applied to the cost of the local cost map 150. Thus, the local cost map 150 may have more real-time characteristics when compared to the global cost map 130. The local motion generation apparatus 100 may generate, by processing circuitry, the local cost map 150 by applying the sensor data to the global cost map 130. Obstacles in the local cost map 150 and/or the local window 120 may include a fixed obstacle and/or a movable obstacle. The movable obstacle may include, for example, a person, a cart, an animal, and a car. For example, a shaded portion 151 may correspond to the fixed obstacle and a shaded portion 152 may correspond to the movable obstacle.

The local motion generation apparatus 100 may generate, by processing circuitry, a local goal map 160 based on the global cost map 130, the global path 142, and/or the local window 120. The local goal map 160 may represent a current position 161 in the local window 120, a local goal 163 in the local window 120, and/or a local path 162 in the local window 120 between the current position and the local goal 163. For example, a portion included in the local window 120 on the global path 142 may be set to be the local path 162, and a point farthest from the current position 161 on the local path 162 may be determined to be the local goal 163.

A center of the local goal map 160 may correspond to the current position of the mobile object and thus, in some figures presented herein, an indication of the current position 161 of the mobile object on the local goal map 160 may be omitted. When the global goal 143 is located outside the local window 120, an indication of the local goal 163 may be located at a boundary of the local window 120. When the global goal 143 is included in the local window 120, the position of the global goal 143 within the local window 120 may be the same as the position of local goal 163 within the local window 120. In this example, the global goal 143 and the local goal 163 may be located in the local window 120.

Hereinafter, the term "global data" may be used to refer to data associated with a global plane such as the global cost map 130 and the global path 142. Also, the term "local data" may be used to refer to data associated with a local plane such as the local cost map 150 and the local goal map 160. The local motion generation apparatus 100 may update, by processing circuitry, the global data and/or the local data at intervals of a predetermined time. In some example embodiments, the local data may be more frequently updated than the global data. In other words, a time interval for updating the global data may be longer than a time interval for updating the local data. Through the update of the global data, sensor data including information on a movable obstacle may be applied to the global data. Similarly, through the update of the local data, sensor data including information on a movable obstacle may be applied to the local data.

The local motion generation apparatus 100 may determine, by processing circuitry, a target velocity using a pre-trained neural network. The mobile object may move through the local path 162 based on the target velocity. The local motion generation apparatus 100 may construct, by processing circuitry, input data including the local cost map 150, the local goal map 160, and the current velocity of the mobile object and input the input data to the neural network. The local motion generation apparatus 100 may acquire, by processing circuitry, output data of the neural network based on the input of the input data to the neural network.

The output data of the neural network may include information corresponding to the target velocity of the mobile object. The local motion generation apparatus 100 may determine, by processing circuitry, the target velocity of the mobile object based on the output data of the neural network. The neural network may be pre-trained to output the output data corresponding to the target velocity of the mobile object in response to the input, into the neural network, of the input data including the local cost map 150, the local goal map 160, and/or the current velocity of the mobile object.

The local motion generation apparatus 100 may include processing circuitry. In some example embodiments, the processing circuitry may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. At least a portion of the neural network may be implemented through the processing circuitry, for example, by software, hardware including a neural processor, or a combination of software and hardware. The neural network may include a deep neural network (DNN) including a fully connected network, a deep convolutional network, and/or a deep recurrent neural network. The DNN may include a plurality of layers. The plurality of layers may include an input layer, at least one hidden layer, and an output layer.

In some example embodiments, the processing circuitry may train the neural network to perform a desired operation by mapping input data and output data that have a nonlinear relationship therebetween through deep learning, which is a machine learning method used to solve a problem given from a big dataset. The deep learning may also be operate as a problem-solving process to find a point where energy is minimized or reduced while training the neural network using provided training data. Through the deep learning, for example, supervised or unsupervised learning, a weight corresponding to a connection between two or more neurons in an architecture such as a model of the neural network may be obtained, and the input data and the output data may be mapped to each other based on the obtained weight.

In some example embodiments, the processing circuitry may train the neural network based on training data at a stage of training and/or may use the neural network to perform an inference action such as classification, recognition, and/or detection of input data at a stage of inference. The neural network may be expressed as a "pre-trained" neural network, where "pre" may mean a time before input data for an inference is input to the neural network. A "start" of the neural network may mean that the neural network is ready for the inference. For example, the "start" of the neural network may indicate that the neural network is loaded in a memory, and/or that the input data for the inference is or may be input to the neural network after the neural network is loaded in the memory.

Figure 2:
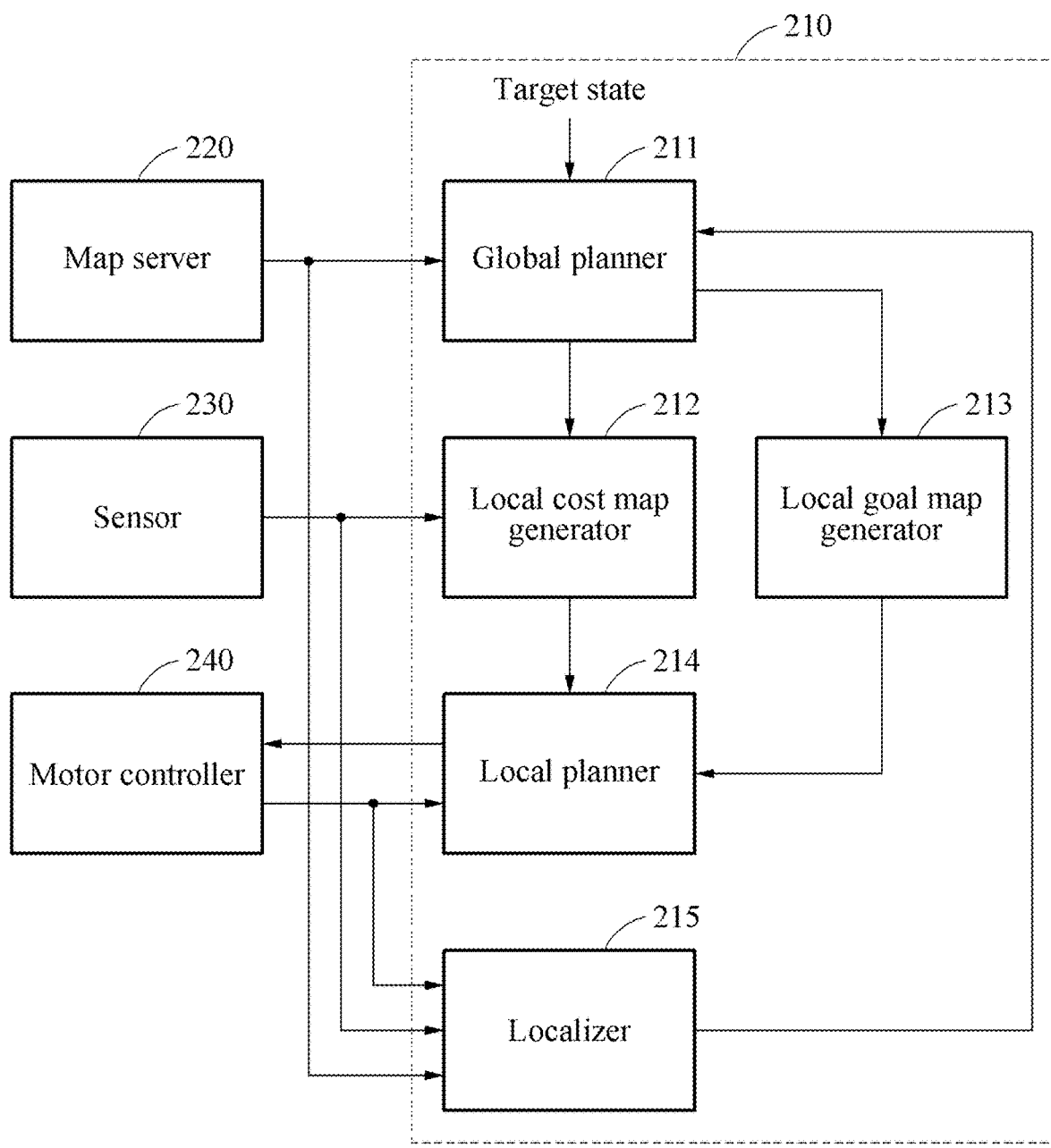
FIG. 2 is a block diagram illustrating a local motion generation apparatus and devices related to the local motion generation apparatus according to at least one example embodiment.

FIG. 2 is a block diagram illustrating a local motion generation apparatus and devices related to the local motion generation apparatus according to at least one example embodiment. Referring to FIG. 2, a local motion generation apparatus 210 includes a global planner 211, a local cost map generator 212, a local goal map generator 213, a local planner 214, and a localizer 215. Although not shown, the local motion generation apparatus 210 may include memory and/or processing circuitry.

Each of the global planner 211, the local cost map generator 212, the local goal map generator 213, the local planner 214, and/or the localizer 215 of the local motion generation apparatus 210 may be implemented by at least one software module, by processing circuitry that may include at least one hardware module, or a combination of at least one software module and at least one hardware module. Operations of the global planner 211, the local cost map generator 212, the local goal map generator 213, the local planner 214, and/or the localizer 215 of the local motion generation apparatus 210 may be understood as an operation of the local motion generation apparatus 210 and/or as an operation of the processing circuitry included in the local motion generation apparatus 210.

A map server 220 may store map data. A sensor 230 may sense an obstacle around a mobile object and output information on the sensed obstacle as sensor data. The sensor data may include information on a fixed obstacle and information on a movable obstacle. The global planner 211 may generate a global cost map based on map data, sensor data, a target state of the mobile object, and/or a current state of the mobile object and determine a global path. The target state of the mobile object may be set by a user. The global planner 211 may determine a cost associated with the fixed obstacle based on the map data, determine a cost associated with the movable obstacle based on the sensor data, and/or generate a global cost map based on the determined costs. The global planner 211 may determine the global path between a current position of the mobile object and the global goal based on the global cost map.

The local cost map generator 212 may generate a local cost map based on the global cost map and the sensor data. For example, the local cost map generator 212 may generate the local cost map by applying the sensor data to the global cost map. The local goal map generator 213 may generate a local goal map based on an area corresponding to a local window and the global path. The local planner 214 may determine a target velocity of the mobile object based on the local cost map, the local goal map, and the current velocity of the mobile object. The local planner 214 may include a pre-trained neural network. The neural network will be described in detail later. The local motion generator apparatus 210 may control the mobile device to move based on the target velocity. For example, the local planner 214 may generate a control command corresponding to the target velocity and/or deliver the control command to a motor controller 240.

The motor controller 240 may control the mobile object to move based on the target velocity, for example, in response to the control command. The motor controller 240 may measure and/or estimate the current velocity of the mobile object. For example, the motor controller 240 may measure the current velocity of the mobile object using a decoder of a motor of the mobile object. The current velocity of the mobile object may be transferred to the local planner 214 and the localizer 215. The localizer 215 may determine the current state of the mobile object based on the map data, the sensor data, and/or the current velocity of the mobile object. The current state of the mobile object may be transferred to the global planner 211.

Figure 3:
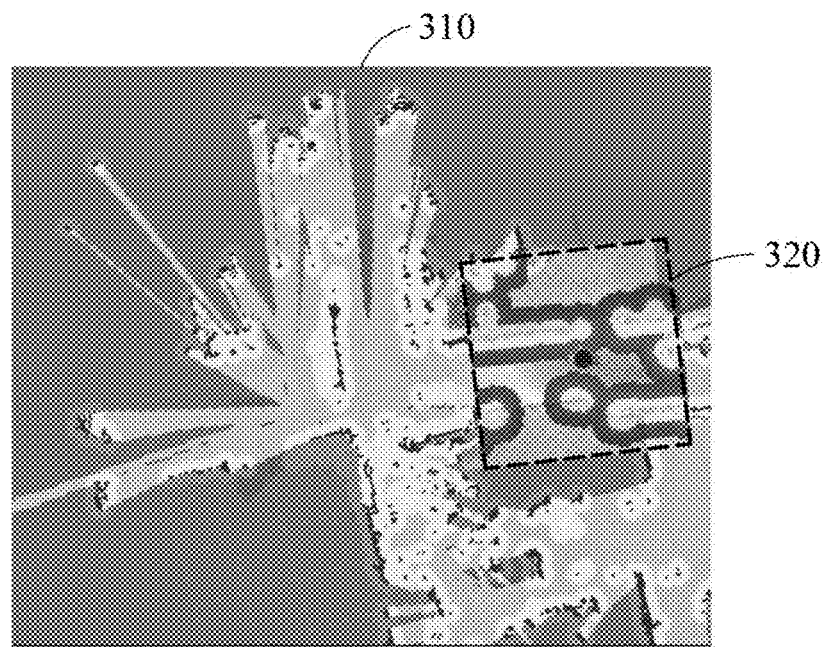
FIG. 3 illustrates a cost map according to at least one example embodiment.

FIG. 3 illustrates a cost map according to at least one example embodiment. A cost map may include a global cost map 310 and a local cost map 320. The local cost map 320 may correspond to a local window that includes a mobile object, for example, positioned in the center of the local window. Real-time information obtained based on sensor data may be applied to the local cost map 320. Thus, the local cost map 320 may have more real-time characteristics and/or may include more accurate obstacle information when compared to the global cost map 310. In the cost map, each pixel value may represent a cost. The cost will be further described with reference to FIG. 4.

Figure 4:
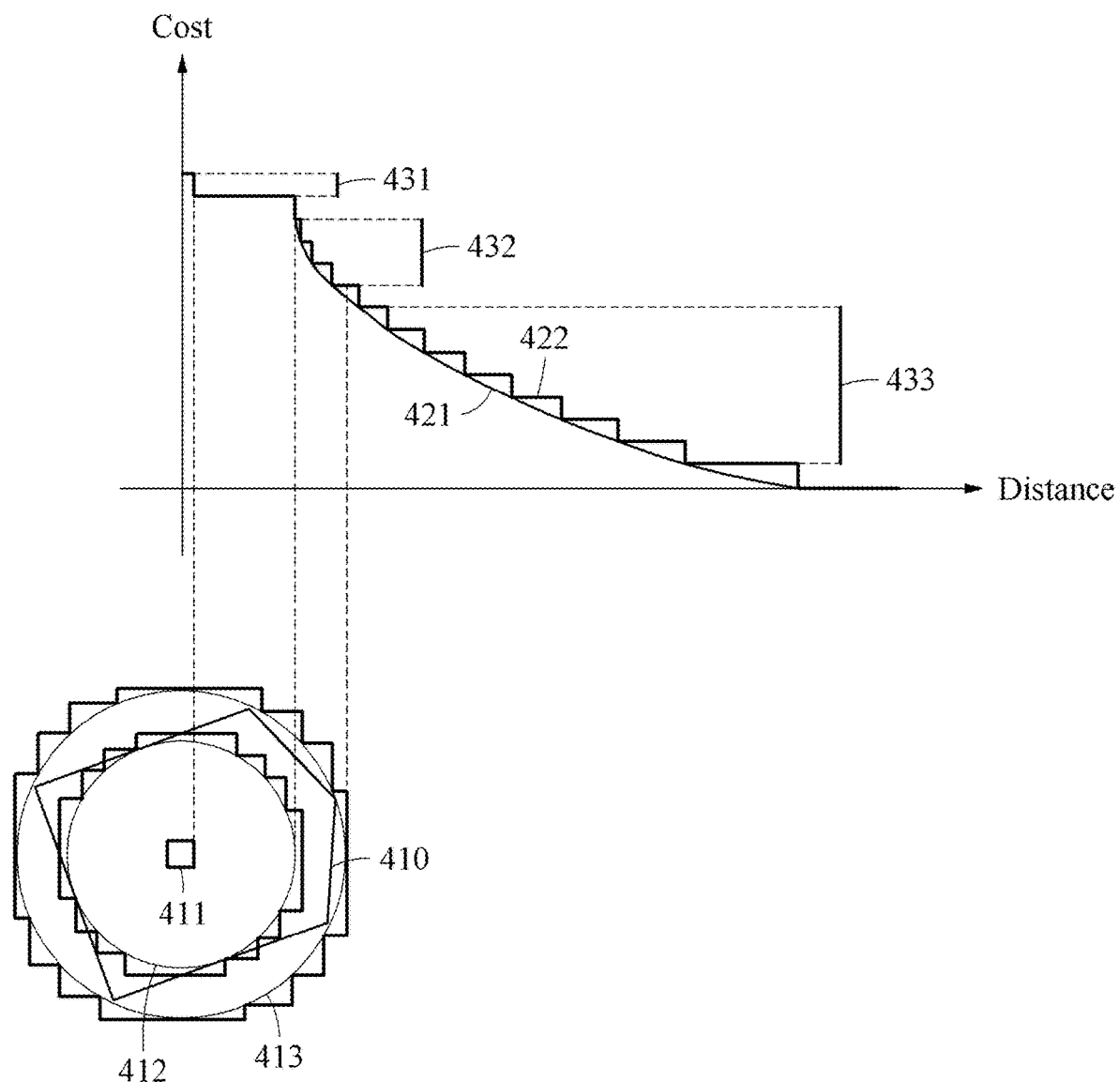
FIG. 4 is a graph illustrating a cost associated with a mobile object according to at least one example embodiment.

FIG. 4 is a graph illustrating a cost associated with a mobile object according to at least one example embodiment. Referring to FIG. 4, a cost corresponding to a distance from a center 411 of a mobile object 410 is represented using a nominal cost decay function 421 and a discretized cost decay function 422. A cost value may increase as a probability of the mobile object 410 colliding with an obstacle increases.

An inscribed region 412 may be a region in which a collision occurs irrespective of a pose of the mobile object 410. A circumscribed region 413 may be a region in which a collision may or may not occur depending on a pose of the mobile object 410. Thus, a collision occurs in a range 431, a range 432 has a probability of a collision, and a collision does not occur in a range 433. A global path, a local path, and/or a target velocity may be determined such that the mobile object 410 may be controlled to move along a path having a low cost corresponding to the range 433, and therefore a reduced probability of colliding with an obstacle.

Figure 5:
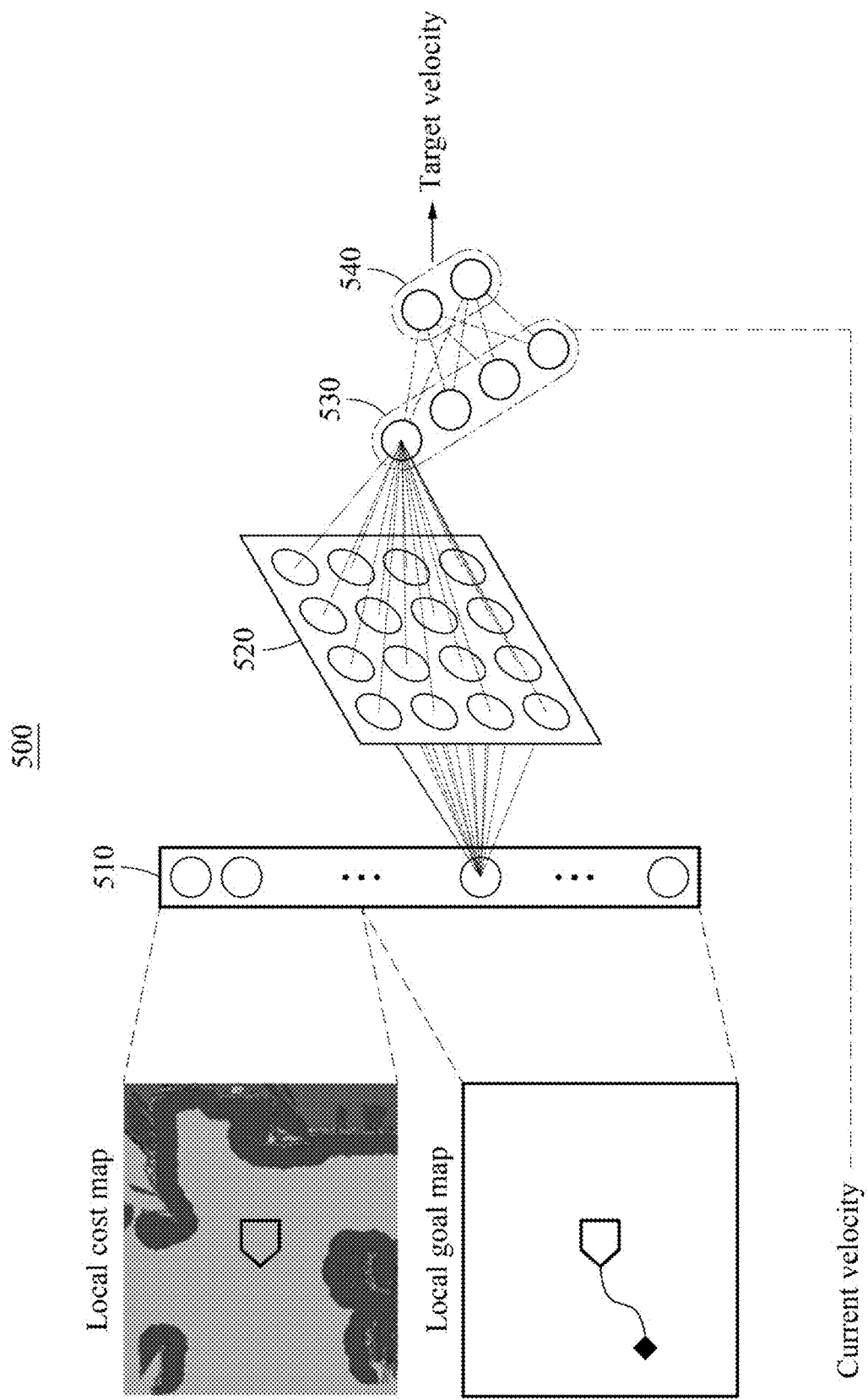
FIG. 5 illustrates a structure of a neural network according to at least one example embodiment.

FIG. 5 illustrates a structure of a neural network according to at least one example embodiment. Referring to FIG. 5, a neural network 500 includes an input layer 510, a first hidden layer 520, a second hidden layer 530, and an output layer 540. The neural network 500 may correspond to the local planner 214 of FIG. 2. FIG. 5 illustrates each of the first hidden layer 520 and the second hidden layer 530 as one layer, but in some example embodiments, the first hidden layer 520 and/or the second hidden layer 530 may each include two or more layers.

The input layer 510 may receive pixel values of a local cost map and/or pixel values of a local goal map. The pixel values of the local cost map may include image information based on a distribution of costs. The pixel value of the local goal map may include image information, which may include a local goal and/or a local path. The input layer 510 may include a plurality of nodes. A number of the plurality of nodes included in the input layer 510 may correspond to a sum of a number of pixels in the local cost map and a number of pixels in the local goal map. The pixels of the local cost map and the local goal map may respectively match the plurality of nodes included in the input layer 510.

The first hidden layer 520 may receive an output of the input layer 510. Each of the nodes of the input layer 510 may be fully connected to nodes of the first hidden layer 520. For example, when the first hidden layer 520 includes M*N nodes, each of the nodes of the input layer 510 may be fully connected to the M*N nodes in the first hidden layer 520 through M*N synapses, wherein each of the M*N synapses may have a weight.

The first hidden layer 520 may be a competitive layer trained based on a competitive learning. The first hidden layer 520 may operate based on the pixel values of the local cost map and/or the pixel values of the local goal map. For example, activity levels of the nodes of the first hidden layer 520 (such as an output of an activation function of each node based on the input to the node) may be determined based on image patterns appearing in the local cost map and/or the local goal map. Here, the image pattern may correspond to a graphical element representing a distribution of obstacles. For example, when the local cost map has an area with a large pixel value, activity levels of nodes corresponding to the area in the first hidden layer 520 may increase. Thus, the image patterns of the local cost map and/or the local goal map may be applied to the nodes of the first hidden layer 520. An activity level of a node may affect activity levels of neighboring nodes due to the competitive learning. Such characteristic of the competitive learning may be suitable for a local motion generation process for determining a path that may reduce a probability of a collision.

The second hidden layer 530 may receive an output of the first hidden layer 520 and/or a current velocity of a mobile object. Nodes of the second hidden layer 530 may be fully connected to the nodes of the first hidden layer 520. For example, when the first hidden layer 520 includes M*N nodes, each of the nodes in the second hidden layer 530 may be fully connected to the M*N nodes in the first hidden layer 520 through M*N synapses, each of the M*N synapses having a weight. The current velocity of the mobile object may be received through at least one of the nodes of the second hidden layer 530.

The output layer 540 may generate output data of the neural network 500 based on an output of the second hidden layer 530. The output data may include information such as a target velocity, which may include a target translational velocity and/or a target rotational velocity. The local motion generation apparatus may determine a target velocity of the mobile object based on the output data and/or control the mobile object based on a control command corresponding to the target velocity.

Figure 6:
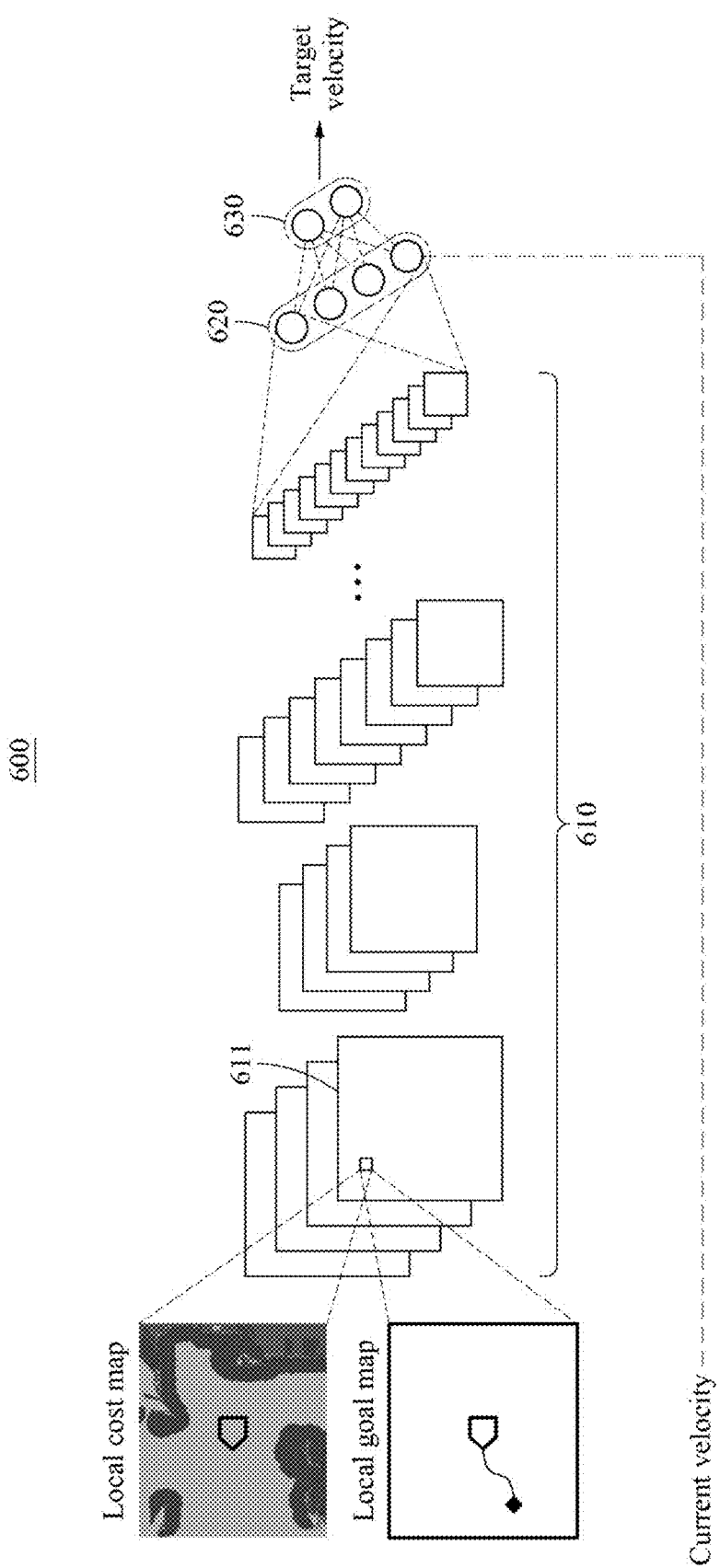
FIG. 6 illustrates a structure of a neural network according to at least one example embodiment.

FIG. 6 illustrates a structure of a neural network according to at least one example embodiment. Referring to FIG. 6, a neural network 600 includes a convolutional layer 610, a fully connected layer 620, and an output layer 630. The neural network 600 may correspond to the local planner 214 of FIG. 2. FIG. 6 illustrates the fully connected layer 620 as one layer, but in some example embodiments, the fully connected layer 620 may include two or more layers.

The convolutional layer 610 may extract features from a local cost map and a local goal map. The convolutional layer 610 may extract the features using a weight kernel 611, which may be one of a plurality of weight kernels. For example, when the convolutional layer 610 includes a first layer, a second layer, and a third layer in sequence, an edge or a corner may be detected from the first layer, a shape may be detected from the second layer, and an object may be detected from the third layer. Convolution and pooling may be performed in a process of extracting the features. Through the convolutional layer 610, features corresponding to image patterns appearing in the local cost map and/or the local goal map may be extracted, so that appropriate output data is generated based on the corresponding image pattern.

The fully connected layer 620 may receive an output of the convolutional layer 610 and/or a current velocity of the mobile object. The current velocity of the mobile object may be received through at least one node of the fully connected layer 620. The output layer 630 may generate output data of the neural network 600 based on the output of the fully connected layer 620. The output data may include information on a target velocity, including a target translational velocity and/or a target rotational velocity. The local motion generation apparatus may determine a target velocity of the mobile object based on the output data and/or may control the mobile object based on a control command corresponding to the target velocity.

Figure 7:
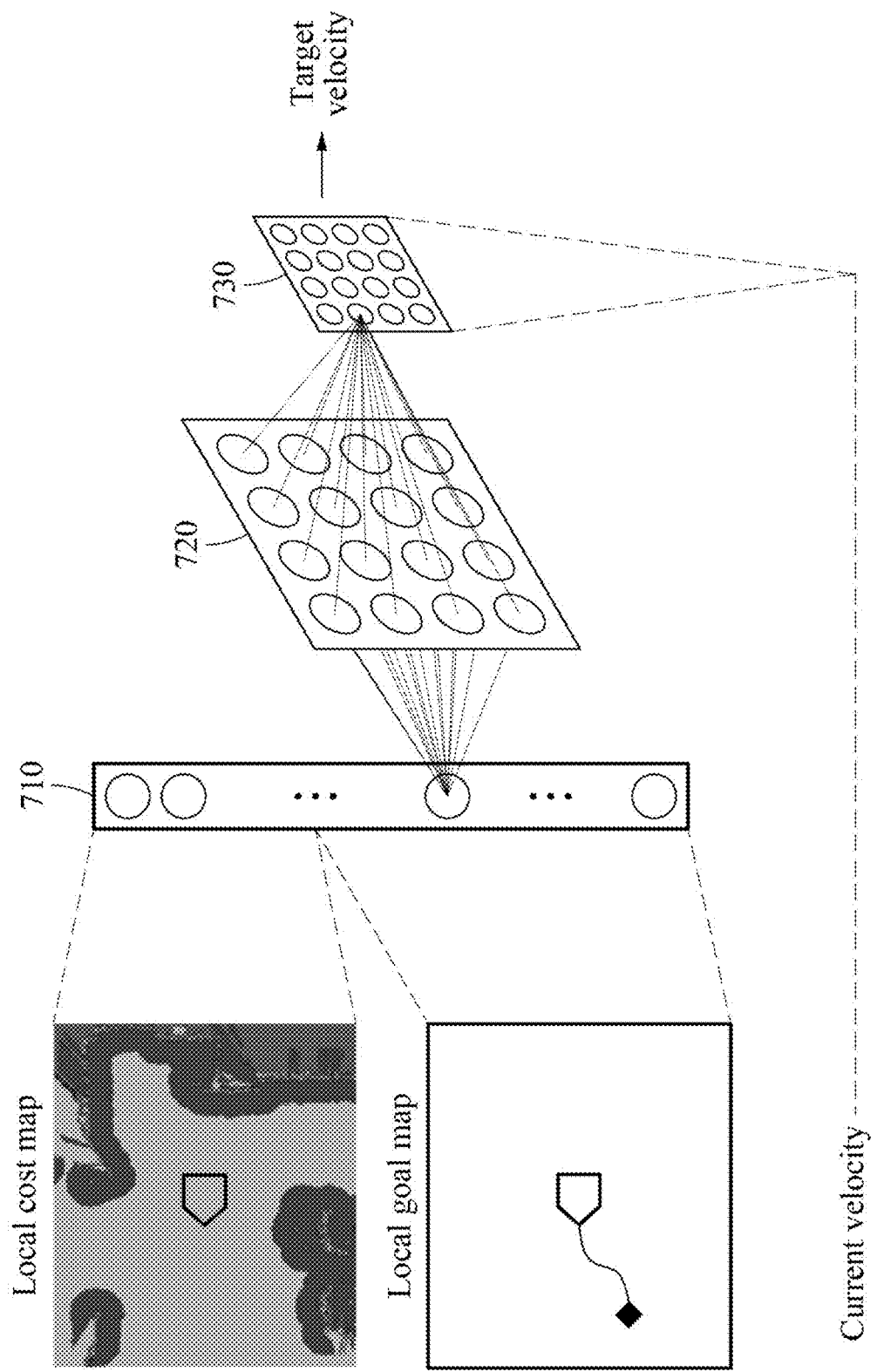
FIG. 7 illustrates a structure of a neural network according to at least one example embodiment.

FIG. 7 illustrates a structure of a neural network according to at least one example embodiment. Referring to FIG. 7, a neural network 700 includes an input layer 710, a first competitive layer 720, and a second competitive layer 730. The neural network 700 may correspond to the local planner 214 of FIG. 2. FIG. 7 illustrates each of the first competitive layer 720 and the second competitive layer 730 as one layer, but in some example embodiments, each of the first competitive layer 720 and/or the second competitive layer 730 may include two or more layers.

The input layer 710 may receive pixel values of a local cost map and/or pixel values of a local goal map. The first competitive layer 720 may receive an output of the input layer 710. The second competitive layer 730 may generate output data of the neural network 700 based on an output of the first competitive layer 720. The neural network 700 may have an output structure that is the same as, similar to, and/or different from that of the neural network 500 of FIG. 5. Other parts of the neural network 700 may correspond to those of the neural network 500.

Due to an assignment of a value (such as a desired, selected, and/or predetermined value) to each of nodes included in the second competitive layer 730, an expression range of a value corresponding to output data may be limited. In some example embodiments, for a competitive layer of a neural network, the inputs of an input vector generated by a previous layer (such as an input layer or a previous hidden layer) may be adjusted prior to the neural network applying an activation function. As a first such example, a competitive layer may scale and/or offset each input of an input vector relative to the other inputs of the input vector, such that the non-bias inputs sum to a particular value, such as zero or the value of the bias input. As a second such example, a competitive layer may determine the input of an input vector that has a highest input value relative to the other inputs of the input vector, and may scale the input values of the other inputs relative to the input of the determined input vector. As a third such example, a competitive layer may determine the input of an input vector that has a highest input value relative to the other inputs of the input vector, and may set the input values of the other inputs of the input vector to zero. Many such variations of competitive layers of the neural network may be devised and included in some example embodiments.

The limitation of the expression range by a competitive layer may prevent or reduce training from continuing in a wrong direction. For example, the second competitive layer 730 may include M*N nodes. A value corresponding to a cell number may be assigned to each of the nodes. Cell numbers of (m, n) may be assigned to the M*N nodes, m being an integer ranging between 0 and M−1 inclusive and n being an integer ranging between 0 and N−1 inclusive. Also, m may correspond to a translational velocity and n may correspond to a rotational velocity. A value of (cell number*k) may be assigned to each of the nodes. Here, k is a scaling value and, for example, 10. A node having a cell number of (3, 3) may represent a translational velocity of 30 centimeters per second (cm/sec) and a rotational velocity of 30 degrees per second (deg/sec).

The local motion generation apparatus may detect a peak node from the second competitive layer 730 and/or determine a target velocity based on a value corresponding to a cell number of the peak node. The peak node may include a node having an activity level exceeding a threshold and/or a node having a highest activity level among nodes. In the foregoing example, when the cell number of the peak node is (3, 3), a target velocity (v, w) may be determined to be (30, 30).

When a number of peak nodes is two or more, the local motion generation apparatus may determine, by processing circuitry, a target velocity based on values corresponding to the peak nodes and/or activity levels of the peak nodes. For example, a ratio of activity levels of peak nodes may be considered. When an activity level of a first peak node is 0.3, a value corresponding to the first peak node is (30, 30), an activity level of a second peak node is 0.6, and a value corresponding to the second peak node is (60, 60), 50 is obtained from "(0.3)*(30)/(0.3+0.6)+(0.6)*(60)/(0.3+0.6)" and thus, the target velocity may be determined to be (50, 50).

Figure 8:
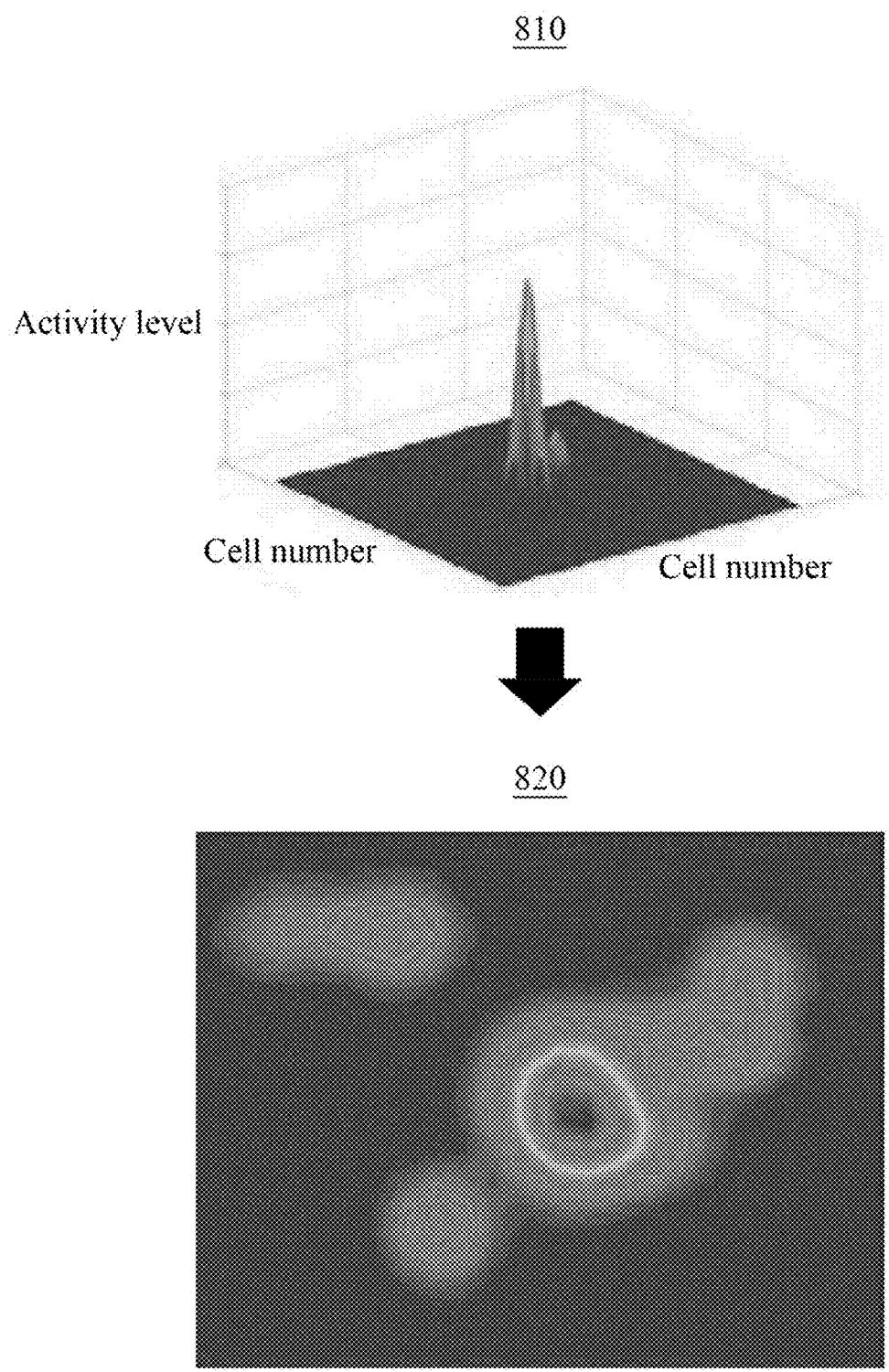
FIG. 8 illustrates an output map according to at least one example embodiment.

FIG. 8 illustrates an output map according to at least one example embodiment. Referring to FIG. 8, a first representation of an output map 810 is shown as a three-dimensional contour plot and a second representation of the output map 820 is shown as a two-dimensional plane such as a heat map. The output maps 810 and 820 may represent a distribution of output data of the second competitive layer 730 of FIG. 7 as an output layer of the neural network 700. Based on the distribution of the output data, a value in a range (e.g., a desired, selected, and/or predetermined range) may be represented. A local motion generation apparatus may determine, by processing circuitry, at least one peak node, a cell number of the peak node, and/or an activity level of the peak node based on the representations of the output maps 810 and 820.

Figure 9:
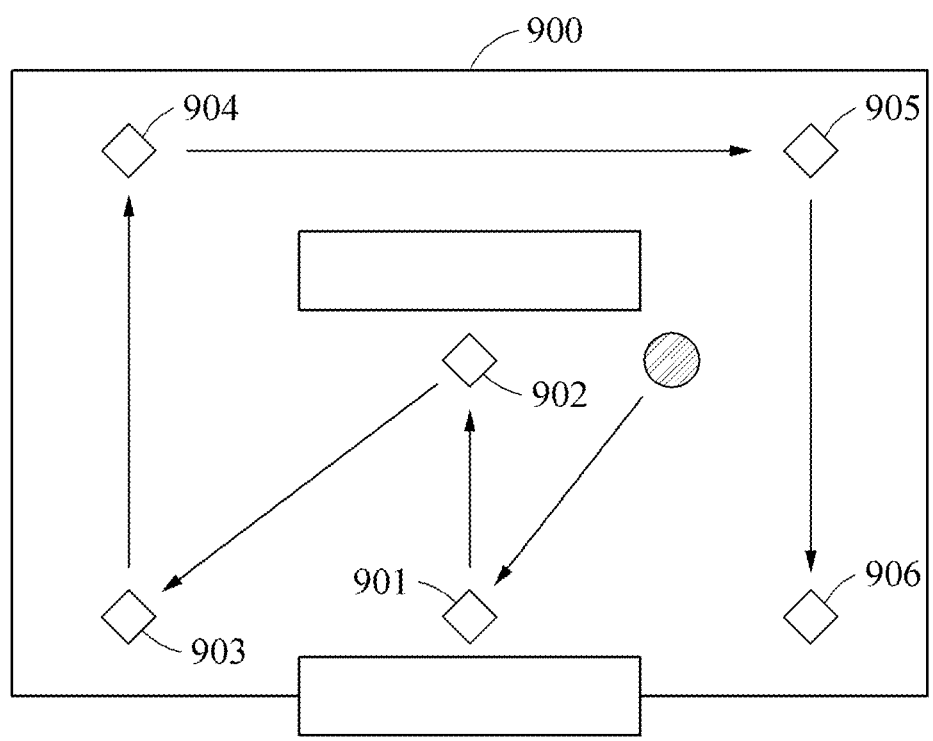
FIG. 9 illustrates a path of a mobile object according to at least one example embodiment.

FIG. 9 illustrates a path of a mobile object according to at least one example embodiment. Referring to FIG. 9, a global area 900 may include a set or sequence of global goals 901 through 906. For example, the global area 900 may correspond to an exhibition hall, the global goal 901 may correspond to an entrance, the global goal 902 may correspond to a main display, the global goals 903 through 906 may correspond to observation courses. A local motion generation apparatus may sequentially evaluate the global goals 901 through 906 and control a mobile object to move based on the global goals 901 through 906.

In an example embodiment, the mobile object may perform the following operations under a control of the local motion generation apparatus. When a visitor comes in, the mobile object may move to the global goal 901, and at the global goal 901, the mobile object may perform greeting, introduction, and giving a follow-up instruction at the global goal 901. The mobile object may move to the global goal 902, and at the global goal 902, may introduce the observation courses with reference to the main display. The mobile object may move to each of the global goals 903 through 906 in sequence, and, at each of the global goals 903 through 906, the mobile object may describe one or more exhibits at the global goal. The mobile object may travel to the global goal 906 and, at the global goal 906, may output a finish greeting. While the mobile object moves through the global goals 901 to 906, the local motion generation apparatus may perform, by processing circuitry, at least one or some of the operations described with reference to FIGS. 1 through 9.

Figure 10:
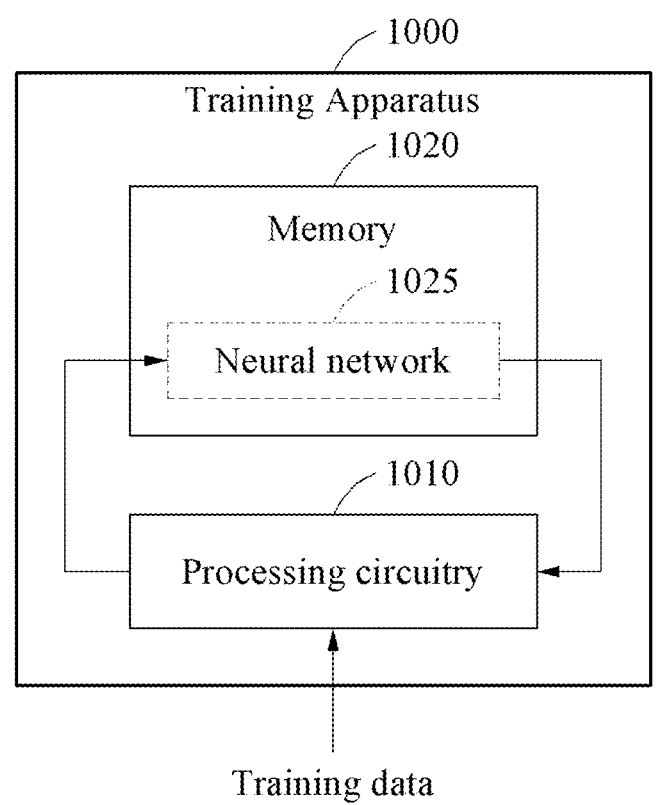
FIG. 10 is a block diagram illustrating a training apparatus according to at least one example embodiment.

FIG. 10 is a block diagram illustrating a training apparatus according to at least one example embodiment. Referring to FIG. 10, a training apparatus 1000 includes processing circuitry 1010 and a memory 1020. The memory 1020 includes a neural network 1025. The neural network 1025 may correspond to one of the neural network 500 of FIG. 5, the neural network 600 of FIG. 6, and the neural network 700 of FIG. 7. The training apparatus 1000 may train, by the processing circuitry 1010, the neural network 700 based on training data. The training of the neural network 1025 may include training a parameter of the neural network 1025, updating the neural network 1025, and/or updating a parameter of the neural network 1025.

The training data may include a training input and a training output. The training input may include a local cost map, a local goal map, and/or a current velocity of a mobile object. The training output may include a target velocity, which may include a target translational velocity and/or a target rotational velocity. The training output may correspond to a label of a supervised learning. The training apparatus 1000 may input the training input to the neural network 1025 and train the neural network 1025 such that an output of the neural network 1025 corresponds to the training output.

Figure 11:
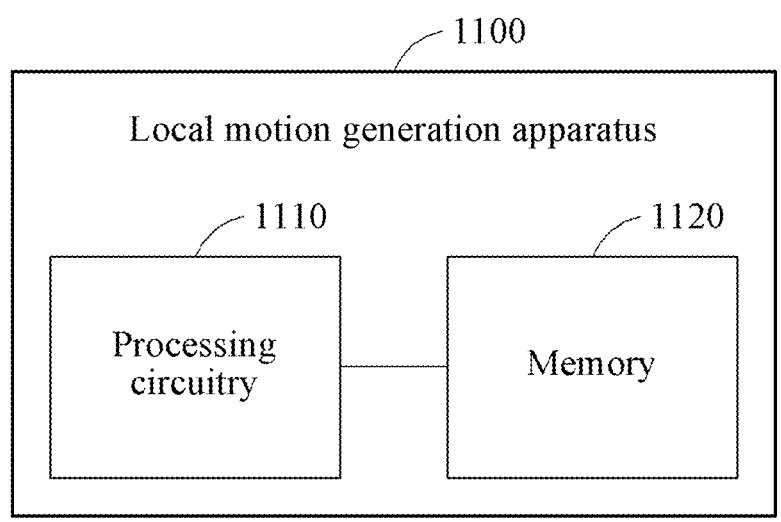
FIG. 11 is a block diagram illustrating a local motion generation apparatus according to at least one example embodiment.

FIG. 11 is a block diagram illustrating a local motion generation apparatus according to at least one example embodiment. Referring to FIG. 11, a local motion generation apparatus 1100 includes processing circuitry 1110 and a memory 1120. The local motion generation apparatus 1100 may perform one or more operations described or shown herein in connection with local motion generation. The memory 1120 may be connected to the processing circuitry 1110, and include instructions executable by the processing circuitry 1110, data to be calculated by the processing circuitry 1110, or data processed by the processing circuitry 1110. The memory 1120 may include a non-transitory computer-readable medium, for example, a high-speed random access memory (RAM) and/or a non-volatile computer-readable storage medium (for example, one or more disk storage devices, a flash memory device, or other nonvolatile solid state memory devices).

The processing circuitry 1110 may execute instructions for performing one or more operations described with reference to FIGS. 1 through 10. The processing circuitry 1110 may determine a local window corresponding to a current position of the mobile object in a global area, generate a local cost map indicating a probability of a collision with an obstacle in the local window, generate a local goal map indicating a local path in the local window between the current position and a local goal in the local window, and determine a target velocity of the mobile object based on output data of a neural network in response to an input of input data including the local cost map, the local goal map, and a current velocity of the mobile object.

FIG. 12 is a flowchart illustrating a local motion generation method according to at least one example embodiment. Referring to FIG. 12, in operation 1210, a local motion generation apparatus generates, by processing circuitry, a global cost map indicating a probability of a collision with an obstacle in a global area based on map data. In operation 1220, the local motion generation apparatus determines, by processing circuitry, a global path in the global area between the current position and a global goal in the global area based on the global cost map. In operation 1230, the local motion generation apparatus determines, by processing circuitry, a local window corresponding to a current position of a mobile object in the global area. In operation 1240, the local motion generation apparatus generates, by processing circuitry, a local cost map indicating a probability of a collision with an obstacle in the local window. In operation 1250, the local motion generation apparatus generates a local goal map indicating a local path in the local window between the current position and a local goal in the local window. In operation 1260, the local motion generation apparatus determines, by processing circuitry, a target velocity of the mobile object based on output data of a neural network, the output data based on an input of input data to the neural network, the input data including the local cost map, the local goal map, and/or a current velocity of the mobile object. The description made with reference to FIGS. 1 through 11 may be applied to the local motion generation method.

The units and/or modules described herein may be implemented using hardware components and/or software components. For example, the hardware components may include microphones, amplifiers, band-pass filters, audio to digital convertors, and/or processing devices. A processing device may be implemented using one or more hardware device configured to carry out and/or execute program code by performing arithmetical, logical, and input/output operations. The processing device(s) may include processing circuitry, such as, for example, a controller, an arithmetic logic unit, a digital signal processor, a microcomputer, a field programmable array, a programmable logic unit, a microprocessor, and/or any other device capable of responding to and/or executing instructions in a defined manner. The processing device may run an operating system (OS) and one or more software applications that run on the OS. The processing device also may access, store, manipulate, process, and/or create data in response to execution of the software. For simplicity, the description of a processing device is used as singular; however, one skilled in the art will appreciate that a processing device may include multiple processing elements and/or multiple types of processing elements. For example, a processing device may include multiple sets and/or types of processing circuitry, such as multiple processors and/or a processor and a controller. In addition, different processing configurations are possible, such an architecture featuring two or more parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, and/or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blu-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Some example embodiments include a machine learning component, such as a neural network. As an example, the processing circuitry may train the neural network that is trained on a set of training data by, for example, a supervised, unsupervised, and/or reinforcement learning model, and wherein the processing circuitry may process a feature vector to provide output based upon the training. Such neural networks may utilize a variety of neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, the processing circuitry may utilize forms of artificial intelligence and/or machine learning other than a neural network, such as, for example, linear and/or logistic regression, statistical clustering, Bayesian classification, decision trees, dimensionality reduction such as principal component analysis, and expert systems; and/or combinations thereof, including ensembles such as random forests.

The use of a machine learning model, such as a neural network, to determine and cause a local motion of a mobile object may present some advantages with respect to other techniques for causing local motion, such as analytic solutions provided by objective functions. As a first such example, a neural network may produce an output, such as a target velocity for the mobile object, using fewer computational resources than other techniques; for example, an objective function may have to evaluate a large number of factors through a comparatively heavy analytic methodology, but a trained neural network may provide the output though feed-forward propagation. Processing efficiency gains such as may be achieved by a neural network may translate into a faster local motion generating process, which may be desirable and/or advantageous in scenarios that depend upon a rapid response to variable events, such as the field of autonomous navigation. As a second such example, efficiency gains may enable the processing circuitry to cause local motion of the mobile object in a manner that may conserve computation, which may enable lower-spec computing hardware to satisfy the circumstances of an application, and/or enable lower-cost computational hardware to be satisfactorily used for such tasks. Such efficiency gains may also, for example, permit the completion of the local motion determination and causation with a lower expenditure of stored power, such as a battery or a fuel supply, thereby promoting energy conservation and extending a duration between refueling. Many such technical effects may improve the functioning of a device in accordance with the present disclosure.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a local motion for a mobile object, the method comprising:
   determining, by processing circuitry, a local window as a subset of a global area such that a center of the local window represents a current position of the mobile object within the subset of the global area;
   generating, by the processing circuitry, a local cost map indicating a probability of a collision of the mobile object with an obstacle in the local window;
   generating, by the processing circuitry, a local goal map indicating a local path in the local window between the current position of the mobile object and a local goal in the local window;
   determining, by the processing circuitry, a target velocity of the mobile object using a neural network trained to output the target velocity in response to input thereto of the local cost map, the local goal map, and a current velocity of the mobile object, wherein the neural network utilizes the pixel values within the local cost map and pixel values within the local goal map to determine the target velocity; and
   controlling the mobile object to navigate through the local path from the current position to the local goal based on the target velocity determined through the trained neutral network.

2. The method of claim 1, further comprising:
   generating a global cost map indicating a probability of a collision of the mobile object with an obstacle in the global area based on map data.

3. The method of claim 2, wherein the generating of the local cost map is based on sensor data associated with an obstacle around the mobile object and the global cost map.

4. The method of claim 2, further comprising:
   determining, by the processing circuitry, a global path in the global area between the current position and a global goal in the global area based on the global cost map.

5. The method of claim 4, wherein the generating of the local goal map is based on the global path and the local window.

6. The method of claim 1, wherein the neural network includes a competitive layer that operates based on pixel values of the local cost map and pixel values of the local goal map.

7. The method of claim 1,
   wherein the neural network includes,
      an input layer that receives pixel values of the local cost map and pixel values of the local goal map,
      a first hidden layer that receives an output of the input layer,
      a second hidden layer that receives an output of the first hidden layer and the current velocity of the mobile object, and
      an output layer that generates output data of the neural network based on an output of the second hidden layer.

8. The method of claim 7, wherein the first hidden layer is a competitive layer trained based on a competitive learning.

9. The method of claim 7, wherein nodes of the input layer are fully connected to nodes of the first hidden layer.

10. The method of claim 9, wherein a number of the nodes of the input layer corresponds to a sum of a number of pixels in the local cost map and a number of pixels in the local goal map.

11. The method of claim 1, wherein the neural network includes,
   a convolutional layer that extracts features from the local cost map and the local goal map,
   a fully connected layer that receives an output of the convolutional layer and the current velocity of the mobile object, and
   an output layer that generates output data of the neural network based on an output of the fully connected layer.

12. The method of claim 1, wherein the neural network includes,
   an input layer that receives pixel values of the local cost map and pixel values of the local goal map,
   a first competitive layer that receives an output of the input layer, and
   a second competitive layer that generates the output data of the neural network based on an output of the first competitive layer.

13. The method of claim 12, wherein a value in a predetermined range is represented based on a distribution of the output data of the neural network.

14. A method of generating a local motion for a mobile object, the method comprising:
   determining, by processing circuitry, a local window corresponding to a current position of the mobile object in a global area;
   inputting to a neural network, by the processing circuitry, input data including a local cost map indicating a probability of a collision with an obstacle in the local window, a local goal map indicating a local path in the local window between the current position and a local goal in the local window, and a current velocity of the mobile object; and
   determining, by the processing circuitry, a target velocity of the mobile object based on output data of the neural network in response to an input of the input data.

15. An apparatus for generating a local motion for a mobile object, the apparatus comprising:
   processing circuitry; and
   a memory comprising an instruction to be read by the processing circuitry,
   wherein when the instruction is executed by the processing circuitry, the processing circuitry is configured to,
      determine a local window corresponding to a current position of the mobile object in a global area;
      generate a local cost map indicating a probability of a collision of the mobile object with an obstacle in the local window;
      generate a local goal map indicating a local path in the local window between the current position and a local goal in the local window; and
      determine a target velocity of the mobile object based on output data of a neural network, the output data of the neural network based on an input of input data to the neural network, the input data including the local cost map, the local goal map, and a current velocity of the mobile object.

16. The apparatus of claim 15, wherein the processing circuitry is further configured to,
   generate a global cost map indicating a probability of a collision of the mobile object with an obstacle in the global area based on map data;
   generate the local cost map based on sensor data associated with an obstacle around the mobile object and the global cost map; and
   determine a global path in the global area between the current position and a global goal in the global area based on the global cost map.

17. The apparatus of claim 15, wherein the neural network includes,
   an input layer that receives pixel values of the local cost map and pixel values of the local goal map,
   a first hidden layer that receives an output of the input layer,
   a second hidden layer that receives an output of the first hidden layer and the current velocity of the mobile object, and
   an output layer that generates the output data of the neural network based on an output of the second hidden layer.

18. The apparatus of claim 15, wherein the neural network includes,
   a convolutional layer that extracts features from the local cost map and the local goal map,
   a fully connected layer that receives an output of the convolutional layer and the current velocity of the mobile object, and
   an output layer that generates the output data of the neural network based on an output of the fully connected layer.

19. The apparatus of claim 15, wherein the neural network includes,
   an input layer that receives pixel values of the local cost map and pixel values of the local goal map,
   a first competitive layer that receives an output of the input layer, and
   a second competitive layer that generates the output data of the neural network based on an output of the first competitive layer.

* * * * *